United States Patent [19]

Sherman et al.

[11] 4,155,255

[45] May 22, 1979

[54] READ-OUT SYSTEM FOR WHEEL BALANCER

[75] Inventors: Donald R. Sherman, San Jose; Donald B. Curchod, Saratoga; Albert L. Mitchell, Milpitas, all of Calif.

[73] Assignee: Nortron Corporation, Sunnyvale, Calif.

[21] Appl. No.: 908,401

[22] Filed: May 22, 1978

[51] Int. Cl.[2] ............................................. G01M 1/22
[52] U.S. Cl. ...................................................... 73/462
[58] Field of Search .................................. 73/462, 464

[56] References Cited

U.S. PATENT DOCUMENTS

| | | | |
|---|---|---|---|
| 3,835,712 | 9/1974 | Muller | 73/462 |
| 3,910,121 | 10/1975 | Curchod et al. | 73/462 |

Primary Examiner—James J. Gill
Attorney, Agent, or Firm—Flehr, Hohbach, Test, Albritton & Herbert

[57] ABSTRACT

A read-out system and method for a wheel balancing machine employs means for determining the minimum angular displacement between a "balance point" on the wheel and a predetermined reference for a stationary portion of the machine using a first scale of displacement and means for converting the minimum angular displacement from the first scale to a second scale. Using the second scale for indicating the balance point enhances the sensitivity of the display means at the balance point. A method is carried out for indicating alignment between the balance point where weight is to be added to an unbalanced wheel to balance same and a predetermined reference position for the machine.

10 Claims, 11 Drawing Figures

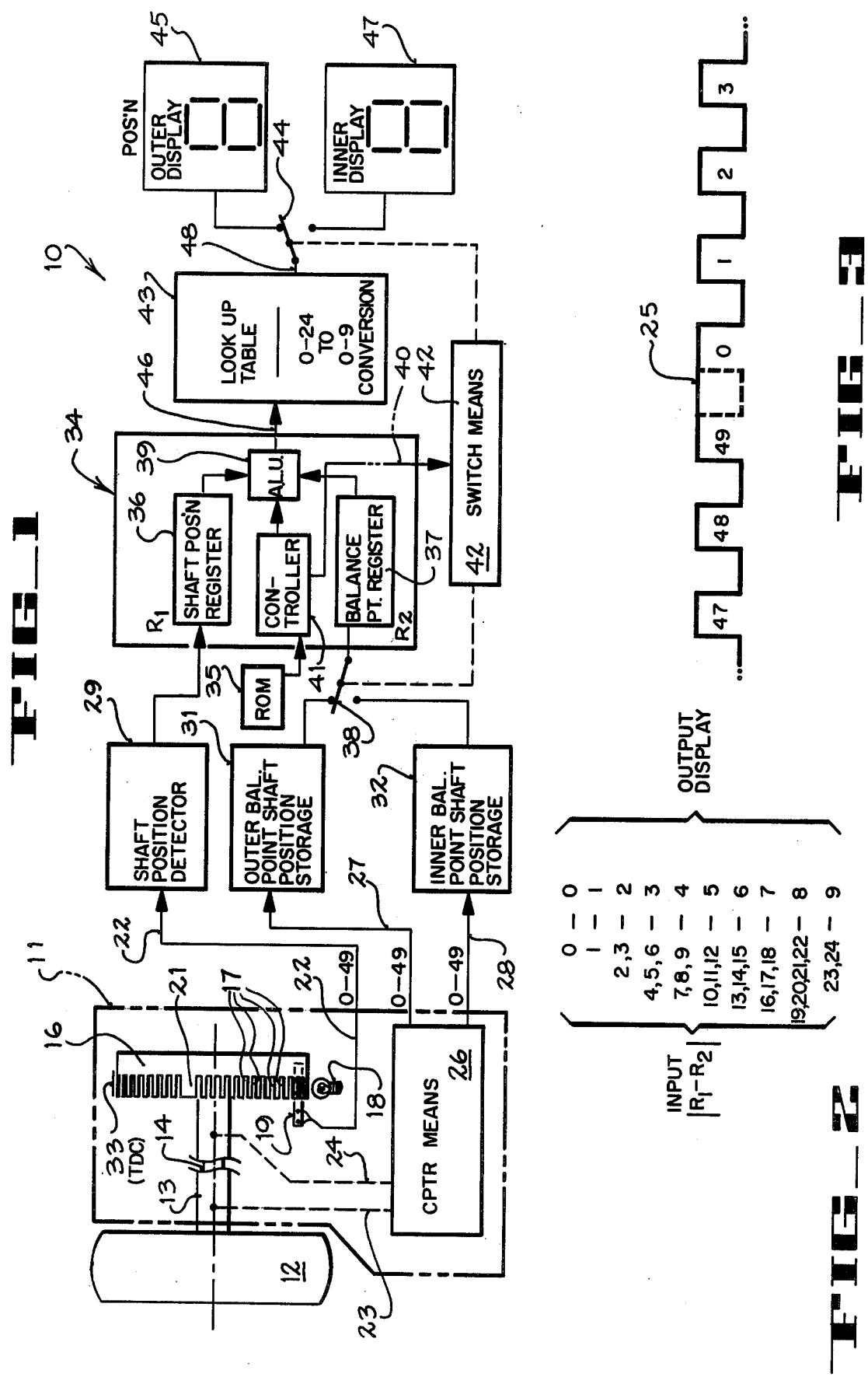

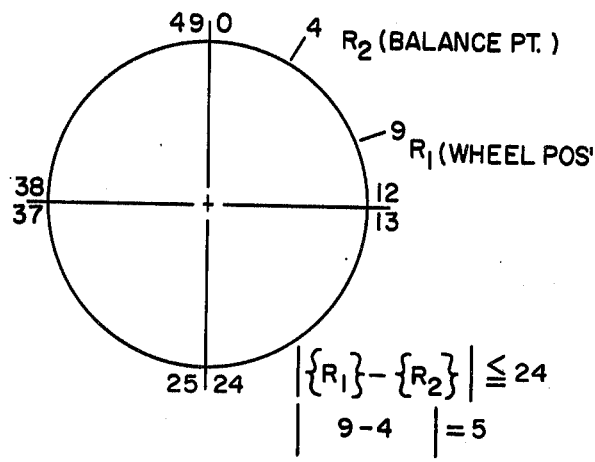
FIG_4
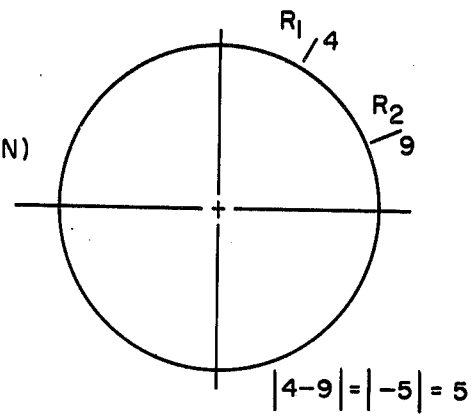
FIG_5
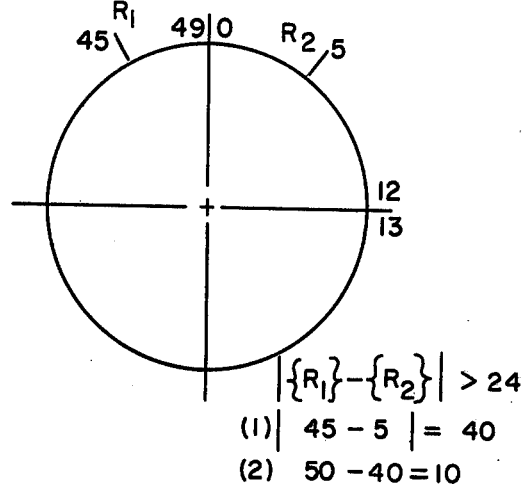
FIG_6
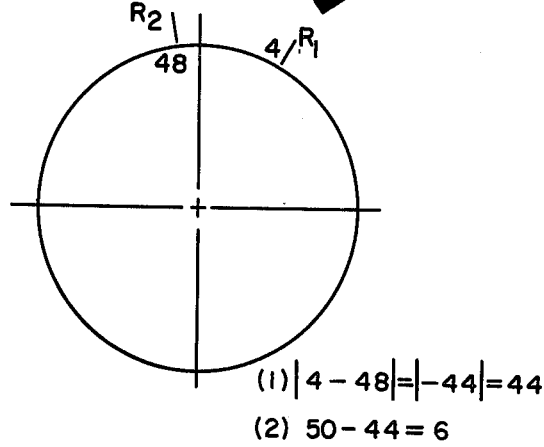
FIG_7
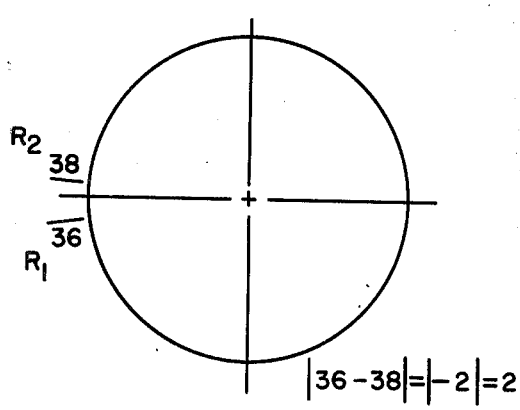
FIG_8
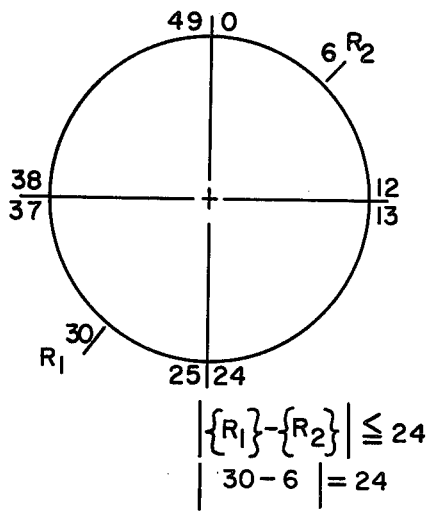
FIG_9

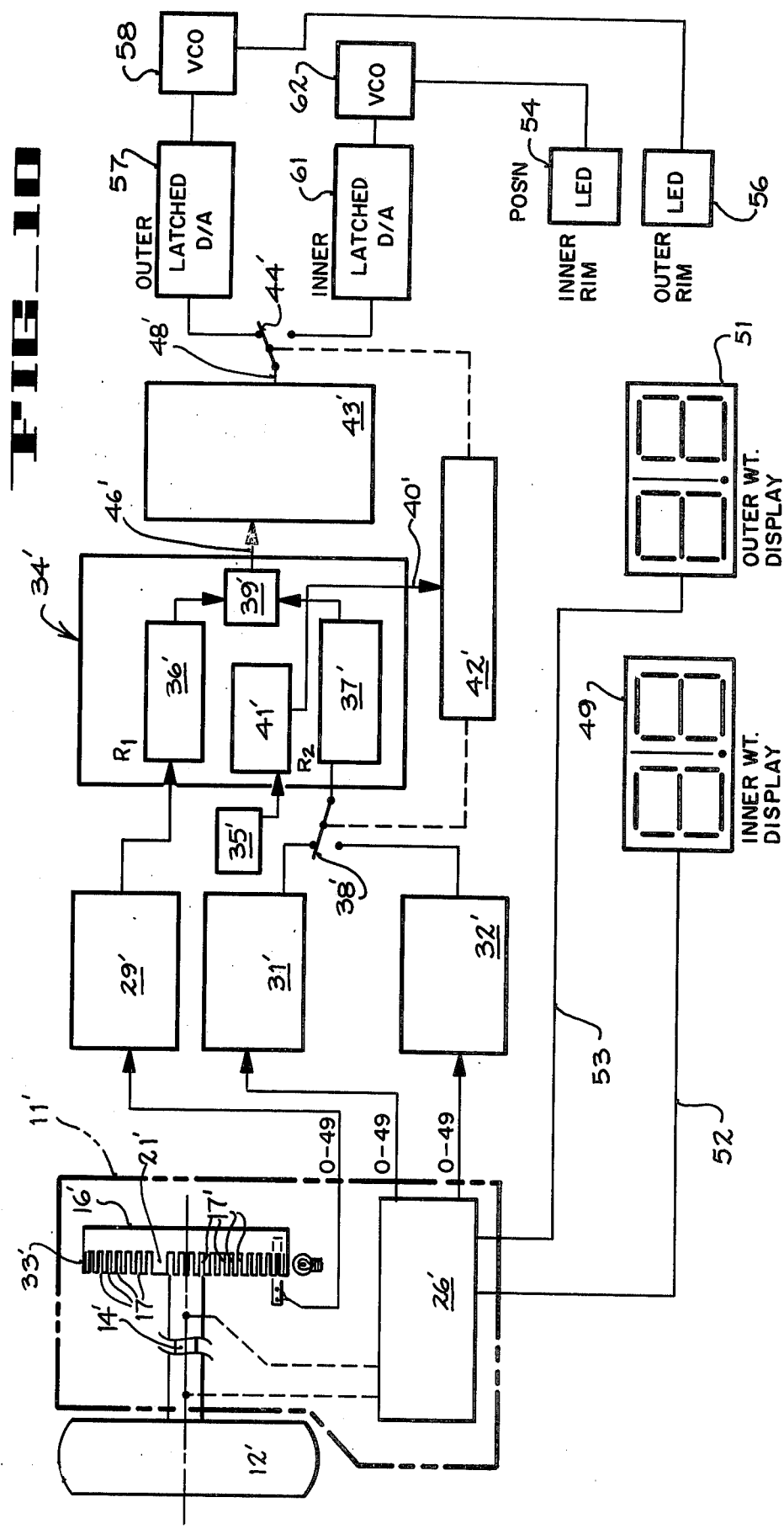

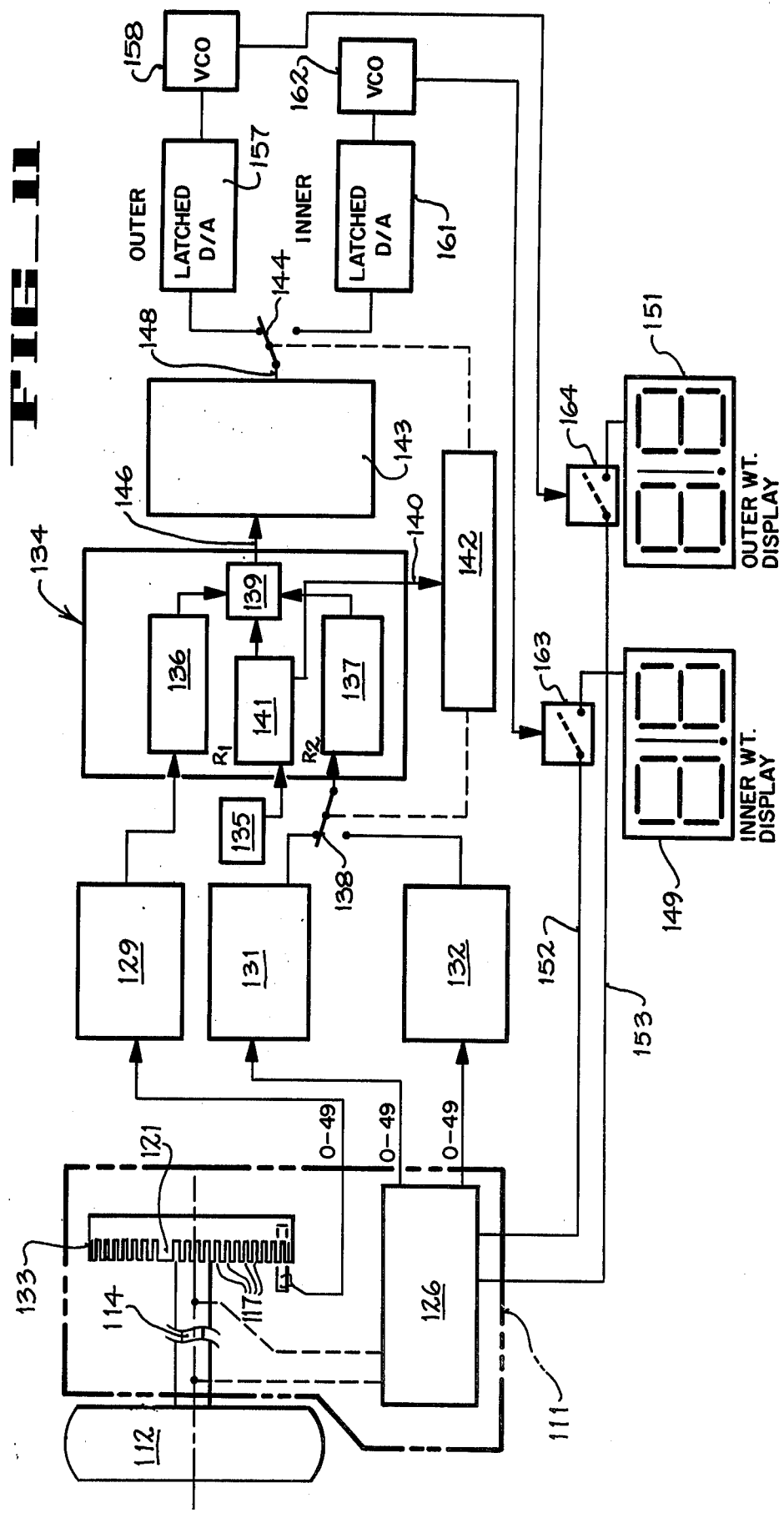

READ-OUT SYSTEM FOR WHEEL BALANCER

BACKGROUND OF THE INVENTION

This invention pertains to a read-out system for use in conjunction with a wheel balancing machine.

As is known, wheel balancing machines, for example, of a type shown in U.S. Pat. No. 3,910,121 include means for mounting a wheel upon a shaft to be rotated therewith. While the wheel and shaft are being rotated suitable sensors serve to detect the angular location and amount of weight to be added at the "balance point" in order to balance it. In apparatus of the kind described the wheel is subdivided into a predetermined number of angular positions. In one instance the wheel is subdivided into fifty angular positions identified by each of a series of fifty numbers formed and distributed around a hub portion which rotates with the shaft carrying the wheel. The detected angular position is displayed to the operator as a number between 00 and 49. To locate the balance point the operator notes the detected position number (i.e. 00-49) appearing in the visual display. This number denotes the number on the hub to be aligned with a predetermined reference for a stationary portion of the machine thereby registering the balance point at such reference. This reference preferably coincides with top dead center of the wheel so that weights can be applied at that location. Accordingly, position displays associated with such a system have necessaryily displayed two orders of digits, i.e. 00-49 and have required the operator to note the angular position number displayed and then register that number (carried by the hub) with the reference.

According to the present invention the need for operator comparison between the displayed position and the wheel position has been eliminated.

In fact, the predetermined reference is not a visible marking at all, but is merely a predetermined rotational position, such as top dead center (TDC). Thus, when the "balance point" of the wheel has been properly rotated into coincidence with the reference it will be at TDC so that the weights can be more easily applied. While reference has been made to the "balance point" of the wheel there are actually two "balance points", one for the plane of each rim and weight is preferably applied to each rim, normally at different angular positions from each other. However, for simplicity reference to a balance point of "the wheel" is believed not to be misleading.

Simply stated as disclosed herein (and after the "balance point" for the wheel has been detected) the system is arranged whereby as the wheel is rotated the angular displacement defined between the "balance point" and a predetermined reference relative to a stationary portion of the machine is represented on a display which varies as the wheel is rotated until the display indicates coincidence between the reference and the balance point. Weight can then be applied to the wheel at that position.

In addition, according to a preferred embodiment, the system is made more sensitive around the "balance point" by employing a first scale associated with the rotational position of the wheel and converting it to a second scale such as a non-linear scale associated with the read-out display means. In this way wheel position can be represented (in one embodiment) by a single digit whose value is reduced to zero at a non-linear rate as the wheel is turned to cause coincidence between the balance point position on the wheel and a predetermined reference position for a stationary portion of the machine.

SUMMARY OF THE INVENTION AND OBJECTS

In general, for use in conjunction with a wheel balancing system means are provided for measuring the angular displacement defined between a predetermined rotational reference position for a wheel and a position defined on the wheel for adding counter-balancing weight so as to balance the wheel. Means for measuring the angular displacement employs information representative of a first range of numbers. The last named numbers are arranged to vary to a predetermined degree in response to a predetermined displacement of the wheel. Means for indicating the angular displacement between the balance point and the predetermined rotational reference position uses information representative of a second range of numbers which vary to a second predetermined degree in response to the first predetermined degree of displacement of the wheel.

Preferably, the first range of numbers varies linearly and the second range of numbers varies non-linearly.

In general it is an object of the present invention to provide an improved read-out system and method.

It is another object of the present invention to reduce the number of display units required in providing a read-out system for a tire balancing machine thereby simplifying the display and its attendant expense.

A further object of the invention is to provide a read-out display which becomes more sensitive in the region around the "balance point" position.

Yet a further object of the invention is to provide a single display in a read-out system for a tire balancing machine to be observed by the operator for indicating the proper positioning of the wheel thereby eliminating the need for the operator to make position comparisons between a number appearing on the display and a number carried on a reference hub by the wheel.

Another object of the invention is to eliminate the expense of providing a reference hub to be carried by the wheel for purposes of making the foregoing comparison.

An additional object of the present invention is to provide a single digit display for indicating the proper positioning of the wheel while retaining a resolution to at least one part in fifty (or other double digit number).

A further object of the invention is to provide a read-out system and method for a tire balancing machine wherein a display flashes the proper weight to be added at a varying rate as the balance point on the wheel approaches coincidence with a predetermined reference on a stationary portion of the machine.

Yet another object of the invention is to provide a read-out system and method for a tire balancing machine wherein a light generating device flashes at a varying rate as the balance point on the wheel approaches coincidence with a predetermined stationary reference for the machine.

The foregoing and other objects of the invention will become more readily evident from the following detailed description of preferred embodiments when considered in conjunction with the drawings.

BRIEF DESCRIPTION OF THE DRAWINGS

FIG. 1 shows a diagrammatic view of a system according to the invention;

FIG. 2 shows a chart representative of one example of the look up table relationships between input and output information for the systems of FIGS. 1, 9, and 10;

FIG. 3 shows diagrammatically a pulse train as generated by the photo sensor 19;

FIGS. 4 through 9 shows illustrative diagrams and equations for explaining operation of the system according to the invention;

FIG. 10 shows a diagrammatic view of a system according to another embodiment of the invention; and FIG. 11 shows a diagrammatic view of a system according to a third embodiment of the invention.

DETAILED DESCRIPTION OF PREFERRED EMBODIMENTS

As shown in FIG. 1 the read-out and display system 10 is arranged to be coupled to a wheel balancing machine 11. Machine 11 rotates a wheel and tire combination (herein a wheel) 12 and determines the balance point for both the inner and outer rims of wheel 12. At this point, the operator can readily rotate wheel 12 to a position registering the balance point of the wheel with a predetermined reference 33 associated with machine 11, for example, at top dead center of the wheel.

Balancing machine 11 includes a bearing housing 13 supporting an elongate shaft 14 for rotation therein. Shaft 14 carries wheel 12 on one end thereof for rotation with the shaft while the other end of shaft 14 carries means for monitoring angular position of the wheel. Thus, a slotted drum or cylinder 16 provides signals indicative of the angular position of wheel 12. Cylinder 16 includes a series of spaced slots 17 disposed to travel between a light source 18 and a photo-electric transducer 19. A single indexing position on cylinder 16 is provided at 21 by filling in the spacing between one pair of adjacent teeth.

Other position detecting means can be employed such as those using magnetics, gray codes, or the Hall effect, for example. Also, the index pulse can be generated by deleting a tooth between two slots so as to extend one slot in drum 16.

Accordingly, as transducer 19 detects position 21 in the cyclic path of slots 17, counting will commence for purposes of determining the rotational position of wheel 12 with respect to a predetermined reference on a stationary portion of the machine at any given moment.

Thus, signals appearing on the output commence with a long index pulse 25 representative of position 21 followed by a repetitive count from 1 to 49 (where cylinder 16 is subdivided into fifty rotational positions, for example). As shown in FIG. 3 a pulse train is shown representative of output signals derived from transducer 19. The pulses shown in FIG. 3 represent the sensing of a gap 17 between teeth formed in cylinder 16. Since the index position 21 is achieved herein by filling in the space between one pair of teeth. Thus, as shown in FIG. 3 index pulse 25 spans positions 49 and 0.

As is shown, for example, in U.S. Pat. No. 3,910,121 mechanical forces transmitted to sensors enable a system as thereshown to determine the rotational position of unbalanced forces derived from the wheel. These positions are detected in the plane of both the inside and outside rims of the wheel. Transducing of such mechanical movements of bearing housing 13 are represented herein by the two dashed lines 23, 24 whereby computer means 26 in machine 11 generates its signals on output lines 27, 28 representative of the "balance point" location on the outer rim and inner rim of the wheel, respectively.

The read-out display system 10 is thus supplied information on line 22 for monitoring the rotational position of cylinder 16 (and wheel 12) with respect to a predetermined reference position 33. System 10 is further supplied information from means 26 for indicating the azimuthal position of the balance point on the outer and inner rims of the wheel.

Shaft position detector 29 provides means for determining the rotational position of tire 12 at any given time and comprises known means such as a counter arranged to be reset upon coincidence of index position 21 with photo-electric transducer means 19. Thus shaft position detector 29 continuously monitors the rotational position of cylinder 16 and tire 12 according to a linear scale (in view of the fact that the spacing between each of slots 17 is substantially uniform, except at index position 21).

After computer means 26 has determined the balance point location for both the outer rim and the inner rim of wheel 12 this information is stored by suitable means, such as a RAM (random access memory) in both the outer and inner balance point shaft position storage means 31 and 32.

Accordingly, means for detecting the angular displacement between a predetermined reference (such as at 33) for a stationary portion of machine 11 and a "balance point" on the wheel (defining the point at which weight is to be added to the wheel to balance the wheel) comprises a microprocessor logic unit 34 including portions forming a shaft position register 36 for receiving the content of shaft position detector 29, a balance point register 37 arranged to be coupled by switch means 38 to be loaded with the content of either the outer or inner balance point shaft position storage 31, 32 respectively, and a suitable arithmetic logic unit 39 for comparing the outputs of registers 36, 37. Logic unit 34 further includes microprocessor portions forming a controller 41 for operation both unit 39 and switch means 42 in response to a sequence of instructions generated by and supplied to controller 41 from a ROM (read only memory) 35.

Thus, controller 41 is suitably arranged to provide switching signals via lead 40 to switching means 42 whereby when the outer balance point shaft position storage 31 transfers information to register 37 the output of a look up table converter 43 will be coupled to display 45 via the switch armature 44.

Logic unit 34 determines the angular displacement between a predetermined reference 33 and the "balance point" position where weight is to be added to balance the wheel. This information is generated according to a first scale, which in the instance shown is a linear scale. The information representative of this displacement appears on output line 46 from arithmetic logic unit 39.

Logic unit 34, as noted, serves to detect the minimum angular displacement between the balance point and predetermined reference position 33 using a first scale.

Means for converting the minimum angular displacement from the first scale to a second scale comprises the look up table converter unit 43 of suitable know means whereby, as illustrated in FIG. 2, the balance point displacement can be initially represented according to the scale on the left and information representative of these numbers is used as the input to converter unit 43 to provide an output according to a different scale, e.g. from zero to nine as indicated on the right of FIG. 2.

For purposes of explanation, registers 36 and 37 shall respectively be referred to as $R_1$ and $R_2$. Referring to FIG. 4, if the balance point is at 4 and the wheel is presently at a position identified as 9 on the linear scale generated by slots 17 with reference to index mark 33 the value in $R_2$ is subtracted from the value in $R_1$ and the absolute difference, if equal to or less than 24 is used directly as an input to look up table 43. Thus, in FIG. 4 $R_1$ is 9 and $R_2$ is 4 so that the input numeral is 5 as shown in FIG. 2. When numeral 5 is used to enter look up table 43 an output signal representative of a 3 is provided. In the embodiment of FIG. 1 a "3" will then be displayed on the associated position display 45 or 47.

In the example shown in FIG. 5 the reverse circumstance is shown so that $R_1$ is at position 4 and the balance point or $R_2$ is represented as at position 9. Accordingly, using the same formulation as before the input information to look up table will be information representative of a numeral 5 whereas the output information will be representative of a numeral 3.

FIG. 6 shows another example wherein the wheel is presently at position 45 and the balance point is determined to be at position 5. Since it is the minimum displacement between $R_1$ and $R_2$ which is to be determined a formulation as shown in FIG. 6 and equations (1) and (2) is followed. Thus, when 5 is subtracted from 45 the absolute value is 40. Since this exceeds 24, the numeral 40 is next subtracted from 50 leaving a displacement of 10 positions between position 45 and position 5. Accordingly, employing 10 as an input to look up table 43 provides information representative of a 5 as the output. Thus, the 5 would be displayed in the related position display 45 or 47.

The example shown in FIG. 7 shows the balance point at the 48th position and the wheel is presently located at position 4. Accordingly, subtracting $R_2$ from $R_1$ provides a value of −44. The absolute value of −44 is then employed, i.e. 44. Since this value exceeds 24 it is then subtracted from the numeral 50 to provide an appropriate indication of the minimum displacement between $R_1$ and $R_2$ of 6 positions. Using 6 as an input to the look up table of FIG. 2 provides an output of 3.

A further example is shown in FIG. 8 which, from the foregoing is believed readily evident.

With regard to FIG. 9 an example is shown wherein the displacement between reference 33 and balance point is exactly 24 which is the present instance represents the greatest minimum displacement which can be determined when using 50 positions designated 0–49.

The foregoing conversion functions in unit 43 are readily accomplished by suitable known means.

As thus arranged input information at line 46 is supplied to look up table means 43 in accordance with a linear scale while the output information or signals appearing on line 48 are representative of a non-linear scale of measurement. Thus, means for converting information representative of the minimum angular displacement using a first scale to information representative of the minimum angular displacement using a second scale is readily provided by use of table look up means 43 of suitable known style. The output information on line 48 serves to operate means for indicating the balance point, such as the seven segment displays 45, 47, respectively indicating balance point position in the planes of the outer and inner rims.

For ease in explanation some of the components in the embodiment of FIG. 10 are designated using the convertion of employing the same number appearing in FIG. 1 with the addition of a prime mark ('). For example, wheel 12 in FIG. 1 is represented in FIG. 10 by the numeral 12', computer means 26 in FIG. 1 is represented as 26', etc.

Having the foregoing in mind the embodiment in FIG. 10 employs inner and outer weight displays 49, 51 using seven segment display elements. Displays 49, 51 are respectively coupled via leads 52, 53 to computer means 26' which determines the amount of weight to be added in accordance with known techniques, such as shown in U.S. Pat. No. 3,910,121. Accordingly, as shown in FIG. 10, means are provided for detecting the proper amount of weight to be added while display means, such as displays 49, 51, are coupled thereto for displaying the detected weight.

Means for indicating the balance point position comprises light generating means responsive to the output signals from the look up table or conversion means 43' for varying the state of the light generating display at a rate associated with a second scale. As shown herein the state of a display in the form of light emitting diodes 54, 56 is varied by flashing at a progressively different rate as the balance point approaches a position coinciding with a predetermined reference position for the machine. At coincidence, for example, the light becomes steady state.

Accordingly, diode 54 represents the position display for the inner rim of wheel 12' and light emitting diode 56 represents the position display for the outer rim of wheel 12'.

In operation, the output from look up table 43' on line 48' is supplied to a latched digital to analog converter circuit 57 whereby a voltage is established representative of the digital input signal from line 48' and held until a different input signal is supplied to circuit 57. Thus the output voltage from circuit 57 serves to drive a voltage controlled oscillator 58 to provide an appropriate rate of energizing of diode 56. As thus arranged diode 56 will flash at a rate representative of the output signal on line 48', namely in a non-linear manner. Preferably, flashing is greater when the balance point is farthest from the predetermined reference 33' and slows to become a steady state condition when the wheel (and balance point) has been moved to coincide with reference 33'. Accordingly, means coupled to converting means 43' receives output signals using a second (non-linear) scale for varying the state of the light generating display at a rate associated with the second scale as the balance point on the wheel approaches coincidence with reference 33'.

Finally, components in the embodiment of FIG. 11 have been designated by the convention of adding a numeral 1 as a third order digit so that predetermined reference 33 of FIG. 1 is now designated as reference 133 and wheel 12 is now designated as 112.

According to the embodiment in FIG. 11 means have been provided for displaying appropriate weight to be added to both the inner and outer rims of the wheel. These weights are indicated by displays 149, 151. As noted above with respect to the embodiment of FIG. 10 balancing machine 111 includes means such as computer means 126 for detecting the weight to be added to each rim of the wheel. This portion of balancing machine 111 is coupled via lines 152, 153 to supply appropriate information to displays 149, 151 respectively.

As shown in FIG. 11 the means for indicating the azimuthal position of the balance point comprises means responsive to the converting means 143 for flashing the appropriate (inner or outer) weight display at a varying rate as the balance point on wheel 112 approaches a position coinciding with reference position 133.

As thus arranged the output on line 148 provides signals representative of a non-linear scale. These signals are supplied to a latched digital to analog converting circuit 157 or 161 depending upon the condition of switch armature 144. The output of each of the two circuits 157, 161 is supplied to an associated voltage controlled oscillator 158, 162 respectively. The outputs from oscillators 158, 162 respectively operate suitable switching means 164, 163 for connecting and disconnecting lines 152, 153 with their related display means 149, 151.

In this manner a display for showing the rotational position can be entirely eliminated and the weight displays 149, 151 can simply be employed for both locating the balance point position for applying the weight and for displaying the amount of weight which is to be attached to the wheel.

As thus arranged, displays 149, 151 flash for example at a slower and slower rate as that balance point on the wheel approaches angular coincidence with reference 133 for machine 111.

In operation, each of the above embodiments carries out a general method for indicating alignment between a balance point where weight is to be added to an unbalanced wheel in order to balance same and a predetermined rotational reference position. The method follows the steps of detecting an azimuthal position of a balance point on a wheel. The next step is to monitor the rotational position of the wheel while comparing the rotational position with the azimuthal position of the balance point to define the angular displacement between the two positions using information representative of numbers of a first scale. The method continues by converting the angular displacement information to information represenative of a second scale of numbers different from the first scale of numbers. Next, information is displayed representative of the displacement between the balance point and reference position using the second scale while rotating the wheel until the display indicates coincidence of the balance point and the reference position.

The embodiment of FIG. 1 carries out the more particular steps of displaying a single order of numbers according to the second scale of numbers so that when the displayed number becomes zero the balance point has become aligned with the reference position.

In the embodiment of FIG. 10 the step of displaying information representative of the second scale comprises the step of varying the state of a light generating display at a rate associated with the second scale as the balance point on the wheel approaches coincidence with the reference position.

In the embodiment according to FIG. 11 the further steps are employed of displaying information representative of the weight to be added at the balance point and then flashing the weight display at a varying rate associated with the second scale of information as the balance point on the wheel approaches a position of coincidence with the reference point.

Accordingly, from the foregoing it will be readily evident that there has been provided an improved read-out system and method for a tire balancing machine whereby the number of display units required for displaying the position of the wheel have been reduced (if not entirely eliminated in one embodiment) thereby simplifying the display and reducing cost. The read-out display is more sensitive around the balance point by employing a non-linear scale for supplying the output information to the display means. Further, in a wheel balancing system employing the foregoing style of read-out system the expense of the reference hub can be eliminated while at the same time simplifying the chore of the operator attempting to align the balance point with a predetermined reference position of the machine. Thus, the operator now merely watches the state of a given display until it indicates that the balance point and reference position coincide.

We claim:

1. In a wheel balancing system of a type having means for detecting the angular displacement between a predetermined rotational reference position for a wheel and a position defined on the wheel for adding counterbalancing weight so as to balance the wheel and in which the angular displacement between said positions is measured using information representative of a first range of numbers in which the numbers representing the angular position of the wheel vary at a predetermined rate in response to rotation of the wheel at a constant rate, a read-out system comprising means for indicating the first named angular displacement within a second range of numbers in which the last named numbers indicate the first named angular displacement while varying at a different rate.

2. In a wheel balancing system of a type having means for detecting the angular displacement between a predetermined rotational reference position for a wheel and a position defined on the wheel for adding counterbalancing weight so as to balance the wheel, means for measuring the angular displacement between the positions using information representative of a first range of numbers, the last named numbers being arranged to vary to a first predetermined degree in response to a first predetermined degree of displacement of the wheel, and means for indicating said angular displacement using information representative of a second range of numbers, the last named numbers being arranged to vary to a second predetermined degree in response to said first predetermined degree of displacement of the wheel.

3. In a wheel balancing system according to claim 2 in which said first range of numbers varies linearly and said second range of numbers varies non-linearly.

4. In a wheel balancing system according to claim 2 in which said indicating means includes display means coupled to receive said information representative of said second range of numbers for displaying the last named numbers to an operator.

5. In a wheel balancing system comprising means for detecting the angular displacement between a predetermined rotational reference position for a wheel and a position on the wheel defining the point at which weight is to be added to the wheel to balance same defining a balance point on the wheel, a shaft mounted for rotation for carrying at one end of the shaft a wheel to be balanced, means for monitoring on a first scale the rotational position of a wheel carried on said shaft with respect to said predetermined reference position, means for computing the balance point, means for detecting the minimum angular displacement between said balance point and said reference position using information according to said first scale, means for converting information representative of said minimum angular displacement as determining using said first scale to associated information using a second scale, and means for indicating said balance point using information according to said second scale.

6. In a wheel balancing system according to claim 5 comprising means for detecting said weight, display means coupled to the last named means for displaying said detected weight, said means for indicating said balance point comprising means responsive to said converting means for flashing said means for displaying said weight at a varying rate as the balance point on the wheel approaches a position coinciding with said reference position.

7. In a wheel balancing system according to claim 5 in which the last named means comprises light generating display means, and means coupled to said converting means for receiving signals using said second scale for varying the state of said light generating display at a rate associated with said second scale as the balance point on the wheel approaches coincidence with said reference position.

8. In a wheel balancing machine according to claim 7 in which said means for varying the state of said light generating display comprises means coupled to receive signals from said converting means using information representative of said second scale for flashing said display means at a rate responsive to said signals.

9. A method of indicating alignment between a balance point where weight is to be added to an unbalanced wheel to balance same and a predetermined rotational reference position comprising the steps of detecting the azimuthal position of a balance point on the wheel, rotating the wheel while monitoring the rotational position of the wheel with respect to said reference position, comparing said rotational position with said azimuthal position of said balance point to define the angular displacement therebetween using information representative of numbers of a first scale, converting said angular displacement to be represented by information representative of a second scale of numbers different from said first scale, and displaying information representative of said second scale while rotating the wheel until displaying information indicating coincidence of said balance point and the reference position.

10. A method of indicating alignment of a balance point on an unbalanced wheel according to claim 9 in which said first scale of numbers comprises a linear scale of numbers and said second scale of numbers comprises a non-linear scale of numbers.

* * * * *